United States Patent [19]
Stuart

[11] Patent Number: 5,356,581
[45] Date of Patent: Oct. 18, 1994

[54] METHOD FOR PRODUCING PELLETS FROM FILM

[75] Inventor: James L. Stuart, Booneville, Ind.

[73] Assignee: Replas Incorporated, Evansville, Ind.

[21] Appl. No.: 890,917

[22] Filed: May 29, 1992

Related U.S. Application Data

[62] Division of Ser. No. 674,164, Mar. 25, 1991, Pat. No. 5,139,403.

[51] Int. Cl.⁵ ............................................. B29C 53/14
[52] U.S. Cl. ................................. 264/103; 156/148; 264/140; 264/339; 264/241; 425/391
[58] Field of Search ................. 264/37, 103, 143, 140, 264/147, 151, 241, 295, 339, DIG. 69; 425/302.1, 308, 315, 319, 391, 402, 505, 508, 514; 156/148

[56] References Cited

U.S. PATENT DOCUMENTS

| | | | |
|---|---|---|---|
| 3,039,908 | 6/1962 | Parmele | 156/166 |
| 3,164,069 | 1/1965 | Wilkie et al. | 425/391 |
| 3,509,797 | 5/1970 | Johnson | 425/308 |
| 3,509,798 | 5/1970 | Johnson | 425/308 |
| 4,009,235 | 2/1977 | Bober | 425/391 |
| 4,164,530 | 8/1979 | Renjilian et al. | 264/339 |

Primary Examiner—James Mackey
Attorney, Agent, or Firm—Woodard, Emhardt, Naughton, Moriarty & McNett

[57] ABSTRACT

A device and method for producing pellets from film. A cradle is rotatably mounted about a longitudinal axis of rotation to a main frame. An axle arranged perpendicular to the longitudinal axis holds one or more rolls of film. A plurality of drive rollers pull the film from the rolls while the rolls are rotated on the longitudinal axis twisting the film into a strand. An oven located between the rolls and drive rollers heats the strand to permanently set the twist therein. A pelletizer located aft of the drive rollers cuts the strand into individual pellets. In a modified version, glass roving is extended through the holder past the roll and wrapped with the film into a single strand. In an alternate embodiment, the roll of film is mounted to an axle having a longitudinal axis extending in the same direction as the axis of rotation. The film is pulled axially off the roll and twisted into a strand.

4 Claims, 7 Drawing Sheets

METHOD FOR PRODUCING PELLETS FROM FILM

This application is a division of application Ser. No. 07/674,164, filed Mar. 25, 1991, now U.S. Pat. No. 5,139,403.

BACKGROUND OF THE INVENTION

1. Field of the Invention

This invention is in the field of plastic film processing.

2. Description of the Prior Art

There is a continual need for reprocessing plastic film which has been rejected for various reasons for its intended use. In many cases, the film is reprocessed into a pellet form so as to be compatible with the handling requirements of molding and/or extrusion. A process known as "densifying" has existed for many years and has been the accepted method to convert film into a pellet-like form. The current densification process has several disadvantages. For example, the film must be cut off from fiberboard cores and hand fed into a machine. The process of removing film from a fiberboard core as well as operation of the machine requires a level of manual labor and thus the quality of the finished product will vary between operators. Further, the densification process requires relatively high energy input to force the film through the machine. In many cases, the finished pellets are not uniform in size or shape causing feed or processing problems in certain molding machines or extruders and the pellets are frequently wet since water must be sprayed into the machine to act as a coolant onto the molten polymer. Likewise, the quality of the pellets vary since the shear that occurs during the densification process often alters the polymer melt flow.

In view of these disadvantages, I have developed a new device and method of converting rolls of film into a more usable form. Disclosed herein is such a device and method which provides a product of superior quality and consistency while still being economical as compared to the prior method. More specifically. I have eliminated the manual labor of cutting film off of fiberboard cores and instead utilize rolls of film which are twisted into a pelletized strand. The method disclosed herein does not require a coolant liquid nor the high energy requirements of the densification process. Further, the melt flow or melt index of the polymer being processed is not altered with the output product being uniform in size, shape, melt and without moisture.

In a non-related product, applicant has noted plastic stir sticks, typically used for stirring drinks, are produced from plastic and have a rod shaped main body.

SUMMARY OF THE INVENTION

One embodiment of the present invention is a device for producing pellets from film including a holder operable to rotatably hold a first roll of film with a longitudinal axis and allow the film to be unwound therefrom. A twister is provided which is operable to twist the film as it is unwound from the roll into a strand and a heater is operable to heat the strand. A driver is engagable with the strand and is operable to move the strand through the heater, and, a pelletizer receives the strand and is operable to pelletize stone.

Another embodiment of the present invention is a method of changing rolled film into pellets including the steps of holding a first roll of film, rotating the roll of film around an axis of rotation, pulling the film from the roll as the roll is rotating twisting the film pulled therefrom into a strand, heating the strand, and, cutting the strand into pellets.

It is an object of the present invention to provide a device and method for changing film into strand or pellets.

A further object of the present invention is to provide a device and method for salvaging plastic film.

Related objects and advantages will be apparent from the following description.

DESCRIPTION OF THE PREFERRED EMBODIMENTS

Figure 1:
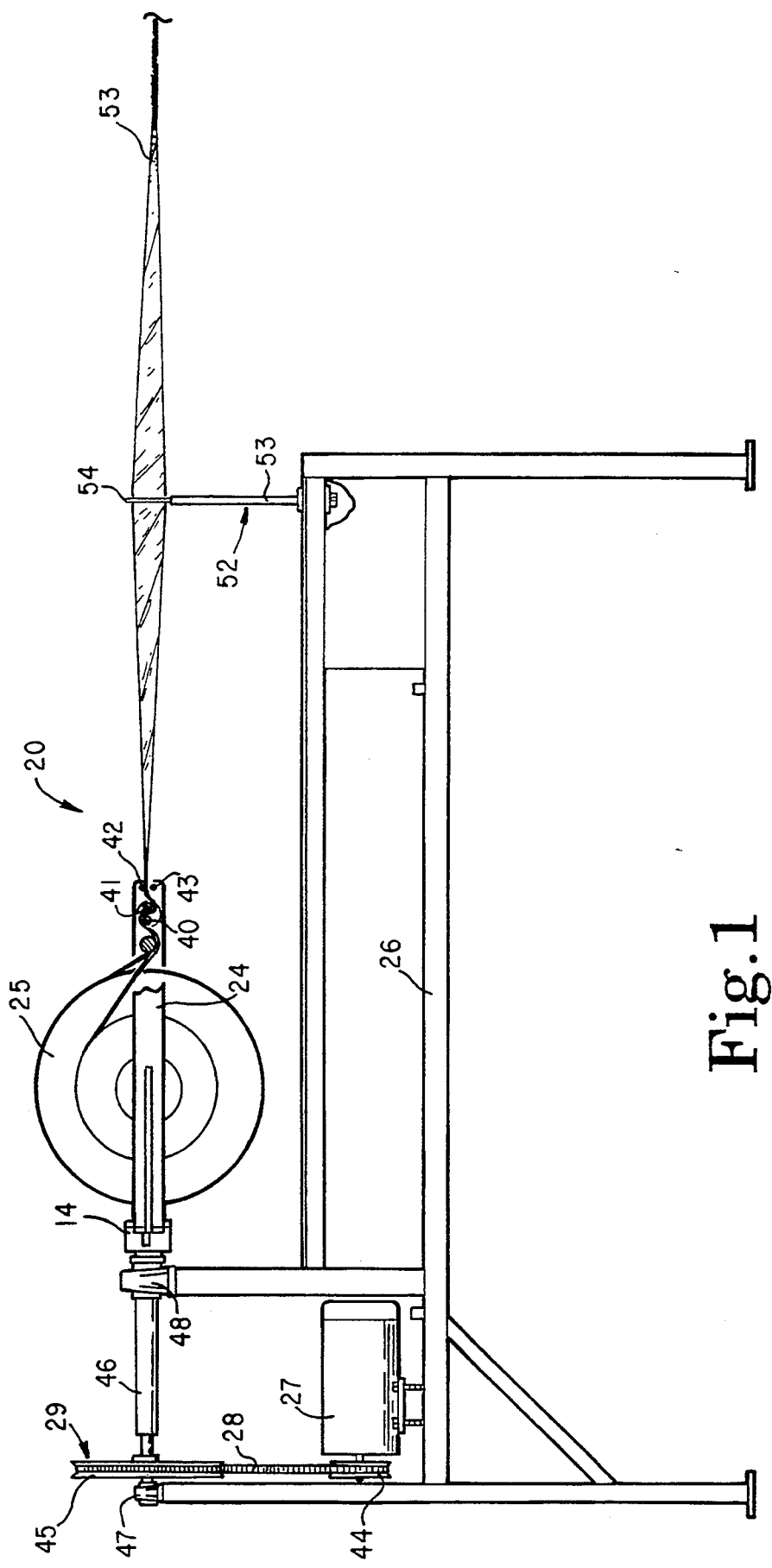
FIG. 1 is a fragmentary side view of the cradle and winding mechanism.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
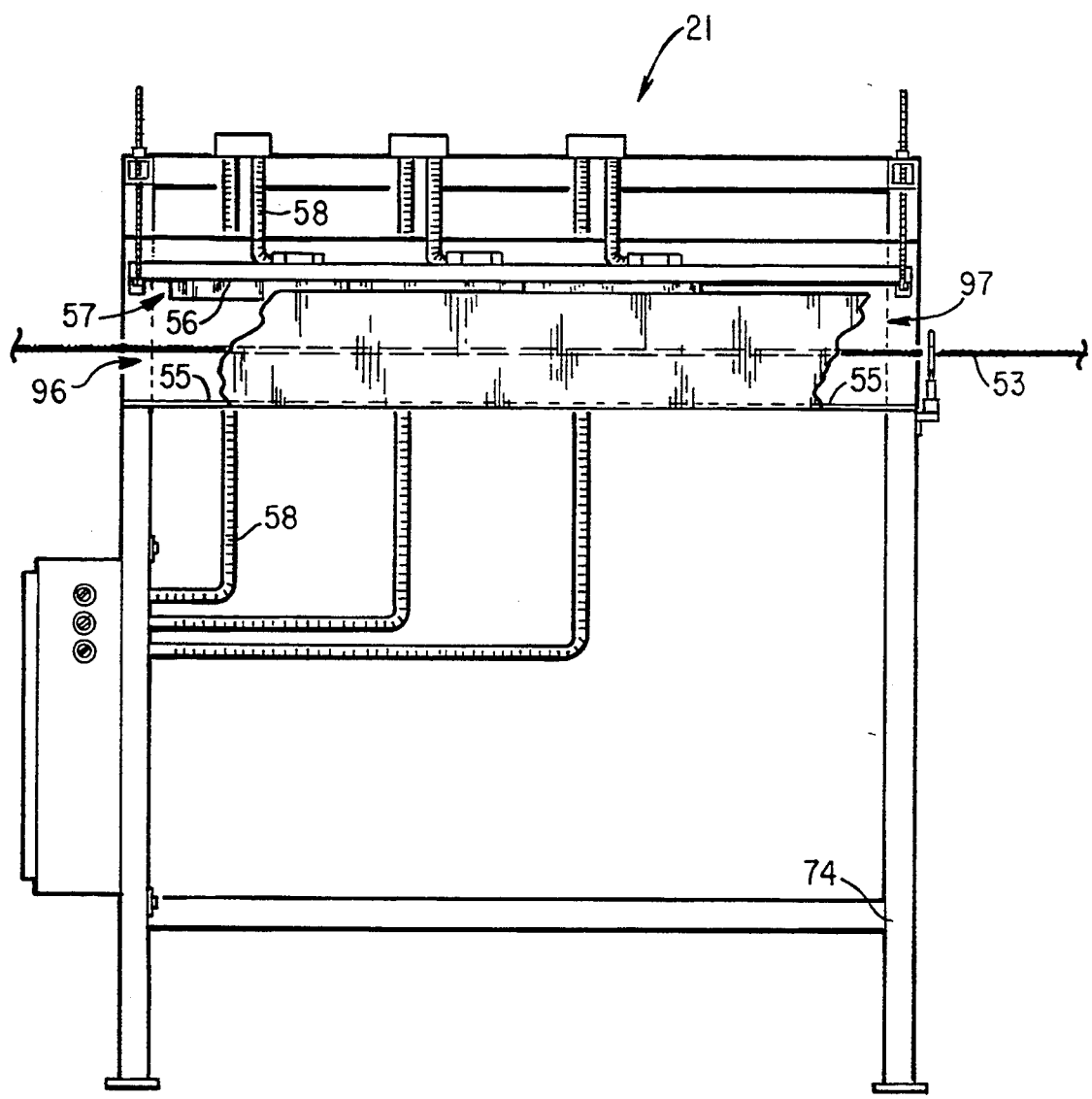
FIG. 2 is a fragmentary side view of the oven.
Figure 3:
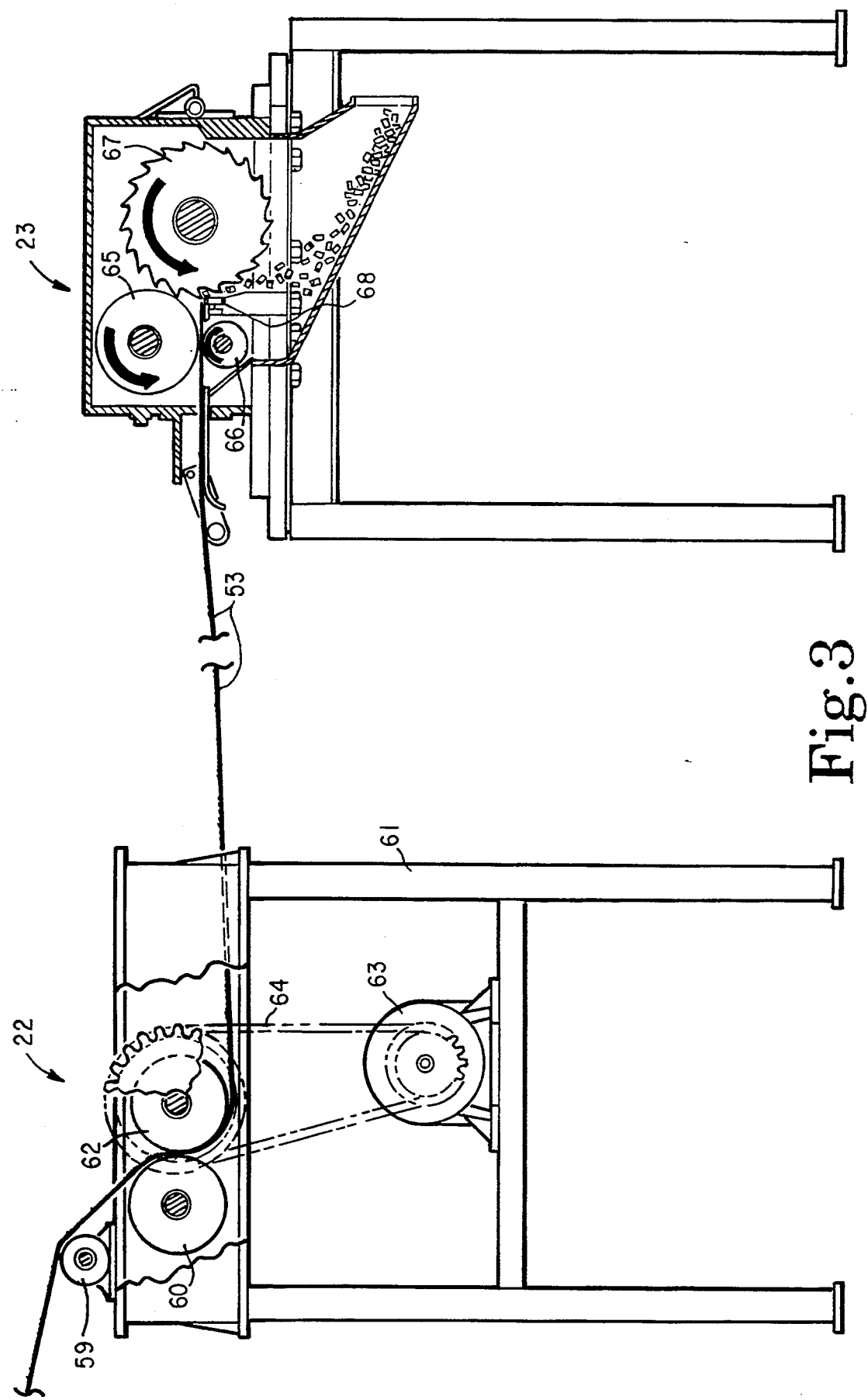
FIG. 3 is a fragmentary side view of the driver and pelletizer.

Referring now more particularly to FIGS. 1, 2 and 3, there is shown the preferred embodiment of the device incorporating the present invention. The device includes a winder 20, oven 21, drive means 22, and pelletizer 23. The four components are aligned along a longitudinal axis. Winder 20 is operable to unwind material from a roll and then direct the resulting strand through an oven 21. Drive means 22 positioned between oven 21 and pelletizer 23 is operable to pull the material from winder 20 through oven 21. The pelletizer 23 is of a conventional design and is operable to cut the strand into pellets.

Winder 20 has a holder or cradle 24 for holding the roll 25 of material [o be unwound. Holder 24 is rotatably mounted to a frame 26 and is rotatably driven by a twisting means including a conventional motor 27 connected by a belt 28 and pulley wheel 29 combination connected to holder 24.

Figure 4:
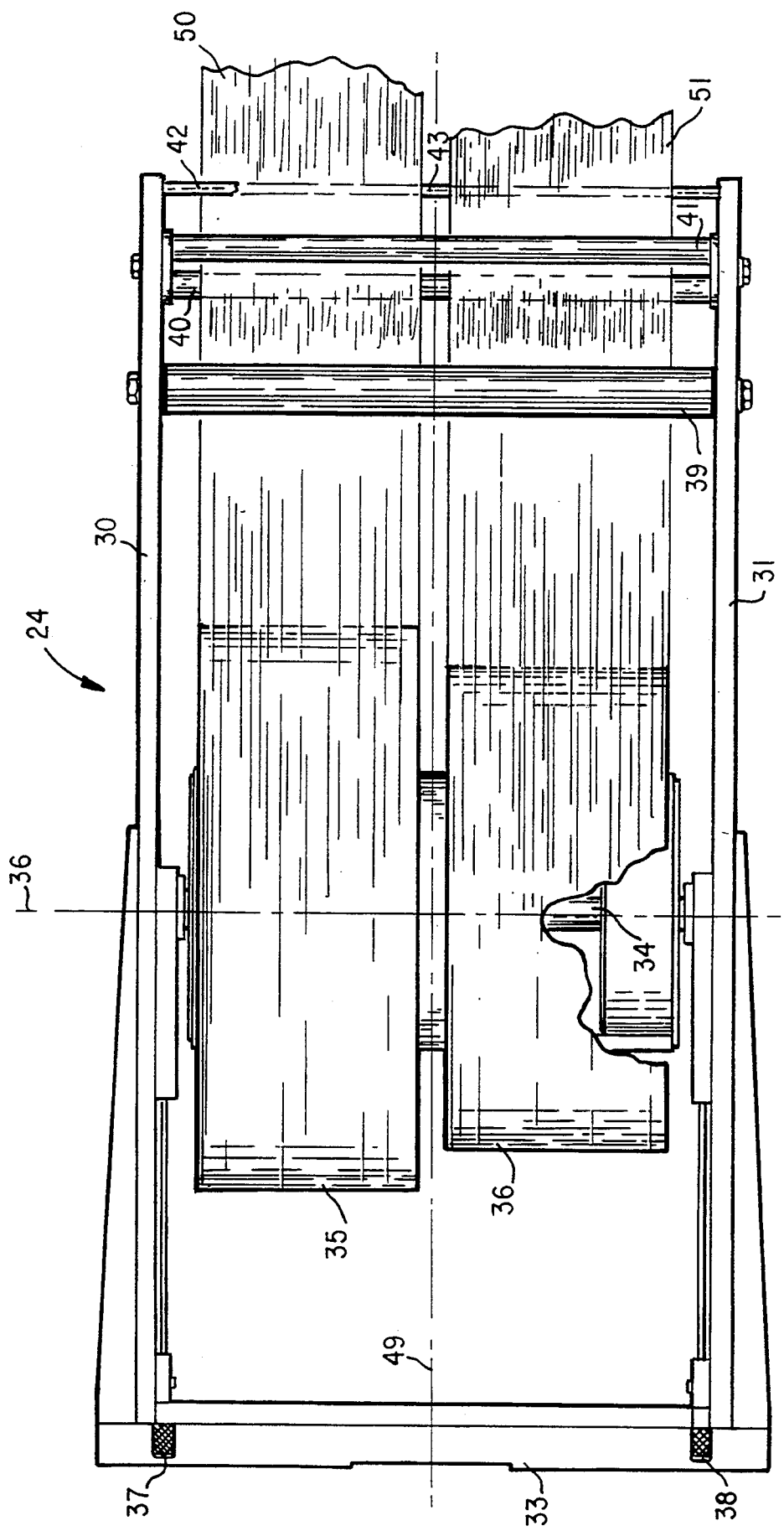
FIG. 4 is a top view of the cradle of FIG. 1.

A top view of holder 24 is shown in FIG. 4 and includes a pair of sidewalls 30 and 31 mounted to an end plate 33 in turn fixedly secured to a mounting block 14 (FIG. 1). An axle 34 is rotatably mounted to and between members 30 and 31 for holding one or more rolls of film or material. In FIG. 4, axle 34, is shown holding a first roll 35 and a second roll 36 in adjacent fashion so that both rolls have the same longitudinal axis 36. A pair of axle bolts 37 and 38 are mounted to members 30 and 31 and hold captive axle 34. Both axle bolts 37 and 38 extend from end plate 33 toward the longitudinal axis 36 of axle 34. Members 30 and 31 include a pair of outwardly opening slots (not shown) into which axle 34 is rotatably mounted. Fasteners 37 and 38 close the outwardly opening slots to hold captive therein axle 34. Thus, by moving fasteners 37 and 38 away from axis 36, axle 34 may be removed from members 30 and 31 to allow new rolls to be mounted to the axle. A guide roller 39 (FIG. 4) is mounted to and between members 30 and 31. Likewise, a pair of tension bars 40 and 41 are mounted to and extend between members 30 and 31. Mounted to the distal end of members 30 and 31 are a pair of guide bars 42 and 43 (FIG. 1).

Electric motor 27 (FIG. 1) is operable to rotate its output pulley 44 in turn moving belt 28. Motion of belt 28 results in the rotation of pulley wheel 45 fixedly mounted to cradle shaft 46 rotatably mounted by a pair of bearings 47 and 48 to frame 26. Mounting block 14 is fixedly fastened to shaft 46 and therefore rotates along with cradle 24 as motor 27 rotates cradle shaft 46. The axis of rotation 49 (FIG. 4) extends centrally and longitudinally on holder 24.

The free end of the film or material wound on rolls 35 and 36 is pulled adjacent guide roller 39 and then fed between tension bars 40 and 41 and between guide bars 42 and 43. The film or sheet material 50 exiting from the cradle from roll 35 is essentially co-planar with the film or sheet material 51 exiting the cradle from roll 36. Rotation of cradle 24 by motor 27 via shaft 46 results in the twisting together of the film or sheet materials 50 and 51 into a single strand. A film support 52 is fixedly mounted to frame 26 (FIG. 1). Film support includes an upwardly extending post 53 having a ring 54 fixedly mounted thereatop. The inside diameter of ring 54 is sufficient to allow both films or sheet materials 50 and 51 to pass therethrough as they are wound into a strand 53.

Oven 21 includes a frame 74 upon which are mounted a pair of spaced apart walls or supports 55 and 56 defining a passage 96 through which strand 53 is pulled. Wall 56 includes a plurality of radiant heaters 57 connected via cables 58 to a source of electrical energy. Radiant heaters 57 are positioned on the downwardly facing surface of wall 56 thereby exposing strand 53 to heat as the strand is pulled through passage 96.

Drive means 22 is located aft of oven 21 and includes a pair of guide rolls 59 and 60 rotatably mounted to the driver main frame 61. A third roll 62 is rotatably mounted to the frame and is driven by a conventional electric motor 63 connected to the roll by means of a sprocket chain combination 64. Driver 22 is operable to pull the film or sheet material from the rolls rotatably mounted to the cradle as the cradle is also rotated along axis 49 (FIG. 4). Likewise, the driver pulls the resultant strand through the oven with the strand eventually exiting driver 22 and entering a conventional pelletizer 23 (FIG. 3). A variety of commercially available pelletizers are available. One such pelletizer is available from Conair Jetro, Bay City, Mich. The pelletizer shown in FIG. 3 is fragmented to illustrate strand 53 passing between an upper feed roll 65 and a lower feed roll 66 to a helix angle rotor 67 which is operable to cut the strand on a bed knife 68 with the resultant pellets falling into a discharge chute. The pelletizer should be spaced apart from the oven a distance to allow the strand to cool before entering the pelletizer. Alternately, fans may be used to cool the strand or the strand may be directed via a plurality of guides along a non-direct route before entering the pelletizer.

Figure 5:
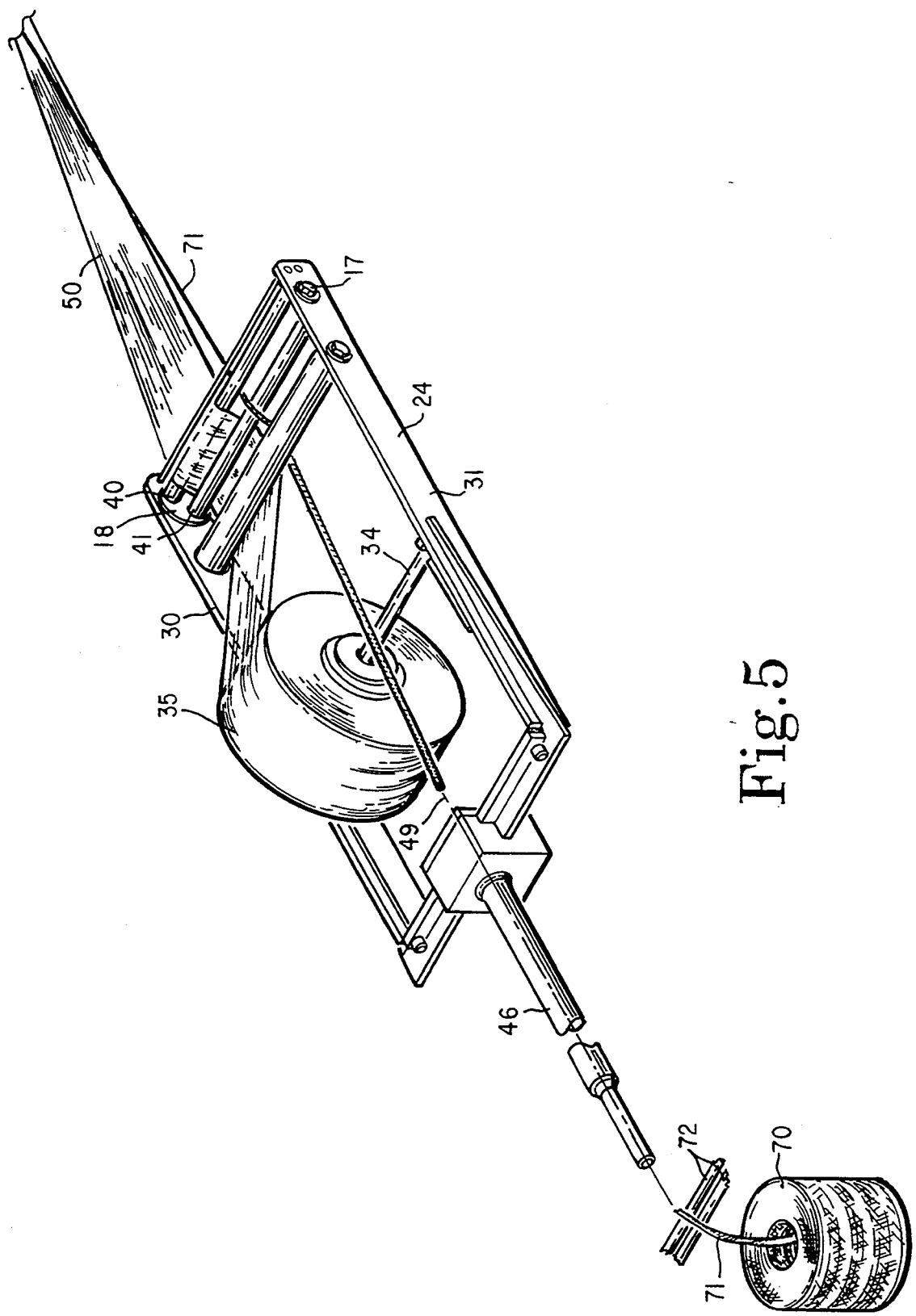
FIG. 5 is a perspective view of a modified version of the cradle of FIG. 4.

A modification of the design shown in FIGS. 1-4 is depicted in FIG. 5 and is provided to twist plastic film around a glass strand. The embodiment of FIG. 5 is identical to that previously described with the exception that a glass strand 71 is drawn through cradle 24. Thus, film roll 35 is rotatably mounted to axle 34 with the end portion 50 of the film being drawn from the cradle as previously described. Glass strand 71 is pulled from glass cake 70 and guided over tension bars 72 through the hollow center of cradle shaft 46. The glass strand then extends through the mounting block of the cradle and extends in the direction of the axis of rotation of cradle 24. The glass strand is directed past roll 35 and exits the cradle via the guide roller tension bars, and guide bars previously described. Thus, as cradle 24 is rotated about axis 49, the film is twisted around the glass strand producing a single glass reinforced plastic strand which is pulled through the oven via drive means 22 (FIG. 3) and eventually pelletized by pelletizer 23. It is possible to twist glass strand with sheet film in the embodiment shown in FIG. 1; however, several advantages are obtained by drawing the glass strand directly from the cake as shown in FIG. 5. These advantages include the elimination of preparation labor. In addition, the ability to pass the glass roving through liquid modifying agents such as organo-functional silanes or liquid colors before the strand reaches the film is possible when utilizing the cake. Such would permit the process to produce value added molding compounds as well as recycling scrap film.

Tension bars 40 and 41 for the embodiments of FIG. 1-5 are mounted to a pair of discs 18 each located inwardly of and mounted to members 30 and 31. Fasteners 17 secure discs 18 to members 30 and 31. Fasteners 17 may be loosened allowing discs 18 to be rotated to adjust the positions of bars 40 and 41. For example, in FIG. 5 bars 40 and 41 are shown as being approximately located at 2 o'clock and 8 o'clock respectively.

Figure 6:
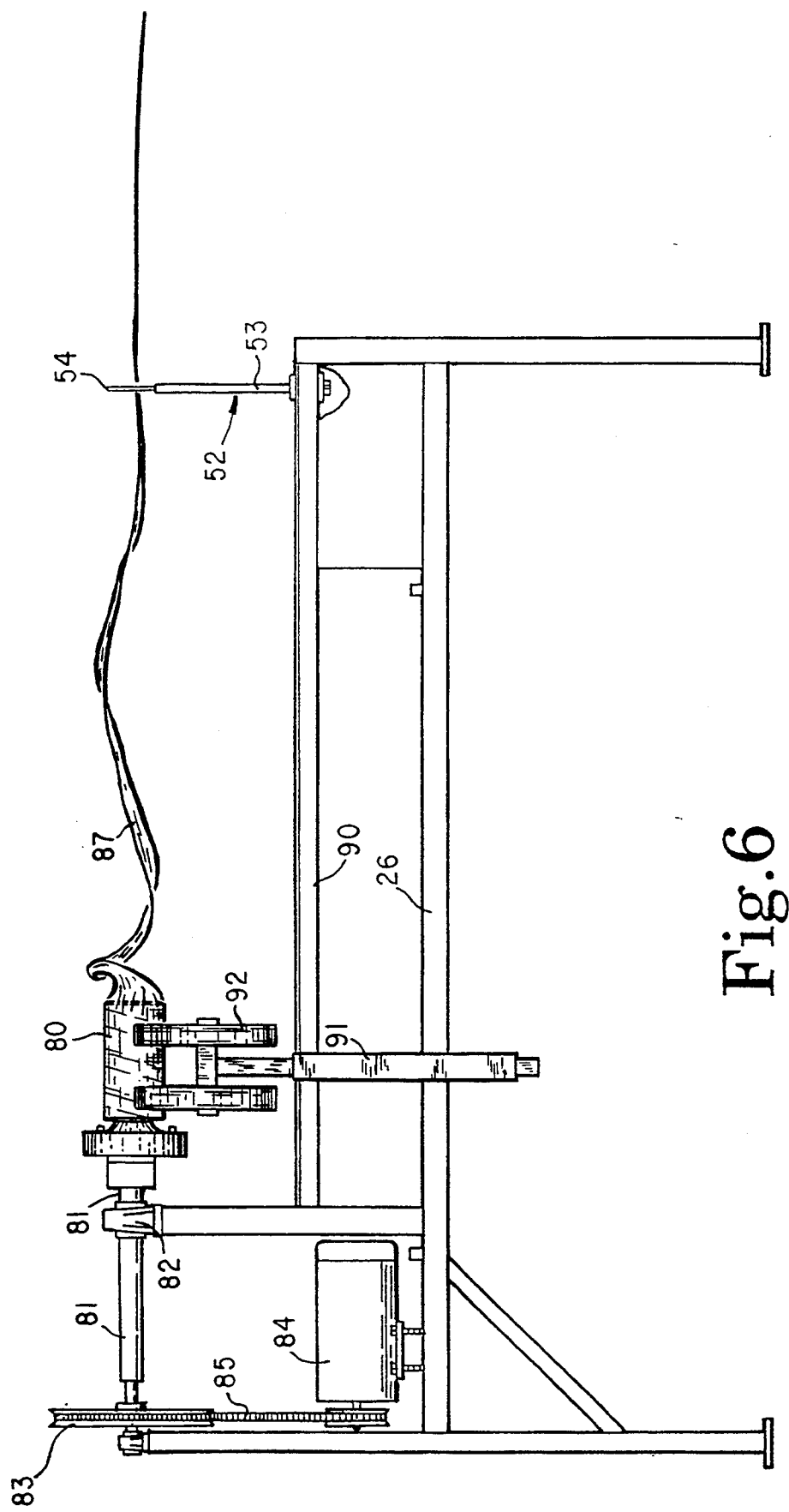
FIG. 6 is a side view of an alternate embodiment of the present invention showing the holder and twisting means.
Figure 7:
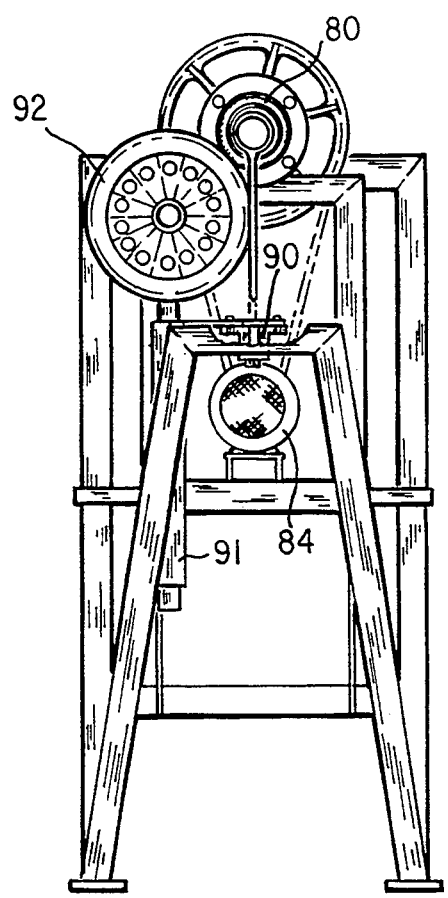
FIG. 7 is a fragmentary end view of the device of FIG. 6.

An additional alternate embodiment of the present invention is shown in FIGS. 6 and 7. The alternative embodiment is identical to the preferred embodiment with the exception that cradle 24 is not utilized. Instead, the roll of film 80 is mounted to axle 81 in turn rotatably mounted by bearings 82 and drivingly connected to pulley wheel 83. The pulley wheel is rotated by means of a belt 85 driven by the output shaft of electric motor 84. The film 87 is axially pulled from roll 80 as roll 80 is rotated by axle 81. Roll 80 is removably mounted to axle 81 but rotates as a unit with the axle as it is rotated about its longitudinal axis. Thus, the distinguishing feature between the alternate embodiment shown in FIGS. 6 and 7 and the preferred embodiment shown in FIG. 1 is that the film is axially pulled from the spool in the alternate embodiment with the roll being rotated about its longitudinal axis whereas in the preferred embodiment (FIG. 1) the film is pulled laterally from the roll in a direction perpendicular to the roll longitudinal axis and in the direction of the axis of rotation of the cradle. In both embodiments, the ring shaped film support 52 is mounted to the frame thereby guiding the film to the oven, drive means and pelletizer.

In order to maintain tension on film 87 being pulled from roll 80, a pair of wheels 92 contact the film on the roll. Wheels 92 are rotatably mounted to bracket 91 which in turn is removably mounted to frame 90. Conventional fastening devices are utilized to secure the wheel frame 91 to main frame 90. The wheels may be vertically adjusted and are spring biased against roll 80. The circumferential edge portions of wheels 92 contact the film on roll 80 thereby maintaining tension on the film as the film is pulled from the roll.

In order to optimize the production of pellets, best results have been obtained by varying the distance between ring guide 52 and the end of cradle 24 depending upon the type of material being twisted. Further, the distance between the radiant heaters 57 and the strand extending through the oven will affect the quality of the product. Best results have been obtained by spacing the heaters 57 apart from the strand a distance greater at the entrance of the oven as compared to the exit 97. Thus, bottom wall 55 is vertically fixed whereas the top wall 56 is movably mounted to the frame in order that wall 56 may be vertically adjusted relative to wall 55 and strand 53. The strand may be positioned approximately two inches above the bottom wall 55.

Following is a table for typical runs. The abbreviations for the type of material in the following table are as follows: PP for polypropylene, PE for polyethylene, LDPE for low density polyethylene. The tension bar setting includes in certain cases a pair of numbers with the first number relating to the setting of tension bar 40 and the second number for the setting of tension bar 41. These numbers relate to the relative clock position as viewed in FIG. 1. For example, for the first entry PP, the tension bars 40-41 are indicated as set (FIG. 1) at 11/5. In this case, bar 40 would be located at 11:00 high as viewed from the side in FIG. 1 whereas bar 41 would be located at a 5:00 position. In the seventh entry, the tension bars 40-41 are indicated as set (FIG. 5) at 2/8 or at 2 o'clock and 8 o'clock. The thickness of the film is in mils whereas the width of the film is in inches. The mast column identifies the distance in inches between ring guide 52 and the distal end of cradle 24. The oven entry and exit columns denote the spacing between the ceiling and floor of the oven. For example, in the first entry the ceiling 56 is indicated as spaced 13 ⅛" from the floor 55 at the entrance of the oven. On the other hand, at the exit 97 of the oven the ceiling 56 is located 12 ¼" from the floor. It is desirable to space the ceiling further from the floor at the entrance so as to preheat the strand as it enters the oven while minimizing breakage of the strand. Typical temperatures encountered in the oven are between 800°-1100° Fahrenheit and/or sufficient to set the memory of the twisted strand.

few pilot runs. A variety of factors including the color of the film, the extent or any printing on the film, thickness, width and film combinations all contribute to the production rate. The amount or type of colors along with the amount of print on the film dictates the heat and speed requirements. Aluminum colored film will reflect heat while a film of a dark red or brown will absorb heat.

Many variations are contemplated and included in the present invention. For example, it is possible to process film in addition to polypropylene and polyethylene including polyester along with some saran/polypropylene layered film. The strand exiting the oven is shown as being fed to a pelletizer; however, it is understood the strand may be fed directly into an extruder or may be wound on a reel for storage in lieu of pelletizing same. The device and method disclosed herein therefore can be used to not only change rolled film into pellets but also into strand which is then directly used or stored. The strand is composed of dense material as compared to the film in sheet form. The method for changing rolled film into dense material includes the steps of holding the roll of film, rotating the roll of film about an axis of rotation, pulling the film from the roll as the roll is rotated thereby twisting the film pulled therefrom into dense material as a strand, and then heating the strand. The density of the strand will vary depending upon the amount of twisting which in turn is a function of factors including the amount of rotation of the film and the rate of film withdrawal from the spool.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A method of changing rolled film into pellets comprising the steps of:
   holding a first roll of film;
   rotating said roll of film around an axis of rotation;
   pulling said film from said roll as rotating and twisting said film pulled therefrom into a strand;
   heating said strand;
   cutting said strand into pellets;
   positioning a second strand of material adjacent said

| MATERIAL TYPE | OPERATING CONDITIONS OVEN PRODUCTION | | | | | | |
|---|---|---|---|---|---|---|---|
| | THICKNESS (mil) | WIDTH (") | MAST (") | ENTRY (") | EXIT (") | RATE LB/HR/STRAND | TENSION BAR |
| PP | 1 | 5 | 11 | 13 1/8 | 12 1/4 | 5 | 11/5 |
| PP | 1 | 5 | | | | | |
| acrylic coated PP | 2 1/2 | 3 1/2 | 1 3/4 | 10 | 6 1/2 | 14.7 | 11/5 |
| heat sealable PP | 1 1/2 | 7 1/2 | 1 3/4 | 13 | 8 1/4 | 9.2 | 1/7 |
| PP | 2 1/2 | 10 1/2 | — | 8 1/2 | 4 1/2 | 22.6 | 12/6 |
| heat sealable PP | 2 1/2 | 11 1/2 | 15 | 8 3/4 | 5 1/4 | 15.1 | 12/6 |
| heat sealable PP | 2 1/2 | 11 1/2 | 0 | 7 3/4 | 3 1/2 | 23.7 | 12/6 |
| PE | 1 1/2 | 3 1/8 | | | | | |
| fiberglass type 30 | | | 1 1/2 | 11 | 4 3/4 | 6 | 2/8 |
| LDPE | 1 | 8 | 21 1/2 | 10 | 5 1/2 | 8 1/2 | N/A |
| LDPE | 1 | 11 | 21 | 8 1/4 | 4 3/4 | 10.8 | N/A |

The location of the ring guide as well as the spacing of the floor and ceiling of the oven may be adjusted depending upon the type of material being twisted. These parameters will be determined by conducting a roll of film;
   pulling said second strand in the direction of said axis of rotation as said roll is rotating and twisting said film and said material into a united strand; and wherein:

during said heating step said film and said material are heated as said united strand; and during said cutting step said united strand is cut into pellets.

2. The method of claim 1 wherein:

said positioning step includes the sub-step of locating said second strand so its longitudinal axis extends in the same direction as said axis of rotation.

3. A method of changing rolled film into dense material comprising the steps of:

holding a first roll of film in a cradle with said roll having a first axis of rotation and said cradle having a second axis of rotation perpendicular to said first axis;

rotating said cradle around said second axis of rotation;

pulling said film from said roll in the direction of said second axis as said roll is rotated about said first axis and twisting said film pulled therefrom into dense material as a strand; and, heating said strand.

4. The method of changing rolled film into pellets comprising the steps of:

holding a first roll of film in a cradle with said roll having a first axis of rotation and said cradle having a cradle axis of rotation perpendicular to said first axis;

holding a second roll of film in said cradle with said second roll having a second axis of rotation coincident with said first axis;

rotating said cradle about said cradle axis;

pulling film from said first roll in the direction of said cradle axis while said first roll is rotated about said first axis;

pulling film from said second roll in the direction of said cradle axis while said second roll is rotated about said second axis;

positioning said film from said first roll adjacent said film from said second roll as said film from said first roll and said film from said second roll are pulled forming a united strand;

heating and cutting said united strand into pellets.

* * * * *

UNITED STATES PATENT AND TRADEMARK OFFICE
CERTIFICATE OF CORRECTION

PATENT NO. : 5,356,581
DATED : October 18, 1994
INVENTOR(S) : James L. Stuart

It is certified that error appears in the above-identified patent and that said Letters Patent is hereby corrected as shown below:

Column 1, line 42 delete "." second occurrence and insert --,--.
Column 1, line 65 delete "stone" and insert --same--.
Column 2, line 54, delete "[o" and insert --to--.
Column 6, line 44 after the word "as" insert --said roll is--.

Signed and Sealed this

Seventh Day of February, 1995

BRUCE LEHMAN

Attest:

Attesting Officer

Commissioner of Patents and Trademarks